US008661497B2

United States Patent
Stone et al.

(10) Patent No.: US 8,661,497 B2
(45) Date of Patent: Feb. 25, 2014

(54) SET-TOP BOX FOR CONVERTING MEDIA SIGNALS BASED ON STORED OUTPUT SETTINGS

(75) Inventors: Christopher J. Stone, Newtown, PA (US); John D. Ogden, Media, PA (US); Carl A. Burger, Hatboro, PA (US); Doug R. Szperka, Oreland, PA (US)

(73) Assignee: General Instrument Corporation, Horsham, PA (US)

( * ) Notice: Subject to any disclaimer, the term of this patent is extended or adjusted under 35 U.S.C. 154(b) by 1145 days.

(21) Appl. No.: 12/339,324

(22) Filed: Dec. 19, 2008

(65) Prior Publication Data

US 2009/0193490 A1  Jul. 30, 2009

Related U.S. Application Data

(60) Provisional application No. 61/023,479, filed on Jan. 25, 2008.

(51) Int. Cl.
*H04N 7/18* (2006.01)
*H04N 7/16* (2011.01)
*G06F 3/00* (2006.01)

(52) U.S. Cl.
USPC ............... 725/151; 725/78; 725/80; 725/131; 725/133; 725/139; 725/141; 725/153; 710/1; 710/11; 710/15

(58) Field of Classification Search
USPC ............. 725/78–82, 115, 131–133, 139–141, 725/151–153
See application file for complete search history.

(56) References Cited

U.S. PATENT DOCUMENTS

| 6,832,241 | B2 * | 12/2004 | Tracton et al. ................. 709/203 |
| 7,176,980 | B2 * | 2/2007 | Stone et al. .................... 348/558 |
| 7,924,861 | B2 * | 4/2011 | Baba et al. ..................... 370/419 |
| 2003/0103570 | A1 | 6/2003 | Du Val | |
| 2003/0214507 | A1 | 11/2003 | Mawatari et al. | |
| 2004/0119894 | A1 * | 6/2004 | Higgins et al. ................. 348/734 |
| 2004/0212610 | A1 * | 10/2004 | Hamlin .......................... 345/211 |
| 2005/0120373 | A1 * | 6/2005 | Thomas et al. .................. 725/58 |
| 2005/0212965 | A1 * | 9/2005 | Stone et al. .................... 348/558 |
| 2006/0092187 | A1 * | 5/2006 | Wang ............................ 345/698 |
| 2006/0218480 | A1 * | 9/2006 | Moggert et al. ............... 715/500 |

(Continued)

FOREIGN PATENT DOCUMENTS

WO  2007/052205 A1  5/2007

OTHER PUBLICATIONS

PCT International Search Report, Re: PCT Application #PCT/US2009/030695 Jan. 12, 2009.

(Continued)

*Primary Examiner* — An Son P Huynh
(74) *Attorney, Agent, or Firm* — Lori Anne D. Swanson

(57) ABSTRACT

A media presentation device converts media signals based on stored output settings. The media presentation device includes a sink-interaction port to at least partially receive device-specific information of a sink device, a data storage and a processor. The processor determines whether one of the plurality of at least partially stored device-specific information matches the received device-specific information of the sink device, and selects output settings corresponding to the stored device-specific information that matches the received device-specific information of the sink device for use in converting the media signals to an output format supported by the sink device.

14 Claims, 3 Drawing Sheets

(56) References Cited

U.S. PATENT DOCUMENTS

| | | |
|---|---|---|
| 2006/0236232 A1 | 10/2006 | Yuasa et al. |
| 2007/0074269 A1* | 3/2007 | Hua .............................. 725/151 |
| 2007/0157260 A1* | 7/2007 | Walker ........................... 725/86 |
| 2007/0157281 A1* | 7/2007 | Ellis et al. ..................... 725/134 |
| 2007/0186015 A1* | 8/2007 | Taft et al. ....................... 710/16 |
| 2007/0188481 A1* | 8/2007 | Christison et al. ............. 345/204 |
| 2007/0192806 A1* | 8/2007 | Park et al. ....................... 725/80 |
| 2007/0242062 A1* | 10/2007 | Guo et al. ...................... 345/204 |
| 2007/0244750 A1* | 10/2007 | Grannan et al. ................ 705/14 |
| 2007/0274689 A1* | 11/2007 | Stone ............................ 386/123 |
| 2007/0280646 A1* | 12/2007 | Seita et al. ..................... 386/96 |
| 2008/0198128 A1* | 8/2008 | Tsai et al. ..................... 345/156 |
| 2008/0201731 A1* | 8/2008 | Howcroft ........................ 725/13 |
| 2008/0201748 A1* | 8/2008 | Hasek et al. ................... 725/98 |
| 2009/0024767 A1* | 1/2009 | Matsuda ........................ 710/15 |
| 2009/0033668 A1* | 2/2009 | Pederson et al. ............. 345/520 |

OTHER PUBLICATIONS

Extended EPC Search Report, Re: Application #09704553.8-1241/2245851 PCTUS2009030695, Sep. 1, 2011.

EPC Examination Report Re: Application #09704553.8-1905, Aug. 30, 2013.

* cited by examiner

SET-TOP BOX FOR CONVERTING MEDIA SIGNALS BASED ON STORED OUTPUT SETTINGS

PRIORITY

This application claims the benefit of the filing date of U.S. Provisional Patent Application No. 61/023,479, filed on Jan. 25, 2008, the disclosure of which is incorporated herein by reference in its entirety.

BACKGROUND

A sink device is a device that receives data over a communications link or input/output (I/O) channel. A source device is a device that outputs data that is received by a sink device. In receiving data from a source device, a sink device generally informs the source device as to which output formats of the source device are supported and/or preferred by the sink device. Such information may be indicated by extended display identification data (EDID) transmitted from the sink device to the source device. EDID is generally stored in a data storage device of the sink device and communicated to the source device, when the sink device connects to the source device.

While EDID is intended to facilitate use of correct output formats by a source device, such intent has often been frustrated when the stored EDID of the sink device is not correct. In such a case, the source device may unintentionally convert media signals to an output format not supported or preferred by the sink device, and the sink device is unable to play the media content at all or unable to play the media content in an optimum setting.

Another problem with using EDID has occurred in a case where a sink device is designed to provide an initial default value for the EDID when the sink device first connects with a source device and to provide subsequent values for the EDID after the sink device is fully booted up. In such a case, because the subsequent values of the EDID are not provided from the beginning, the source device may be delayed in or prevented from using correct output formats.

Still yet another problem with using EDID has been that output formats of a source device are generally dictated by the EDID of the sink device and that, if a user wishes to have customized output formats, the user has to manually override the output formats dictated by the EDID of the sink device to the customized output formats each time that the sink device is disconnected from and reconnected to the source device.

Thus, a source device that uses stored output settings, including user customizations, of the source device in converting media signals to an output format supported and/or preferred by a sink device would be useful.

BRIEF DESCRIPTION OF DRAWINGS

The embodiments of the invention will be described in detail in the following description with reference to the following figures.

DETAILED DESCRIPTION OF EMBODIMENTS

Figure 1:
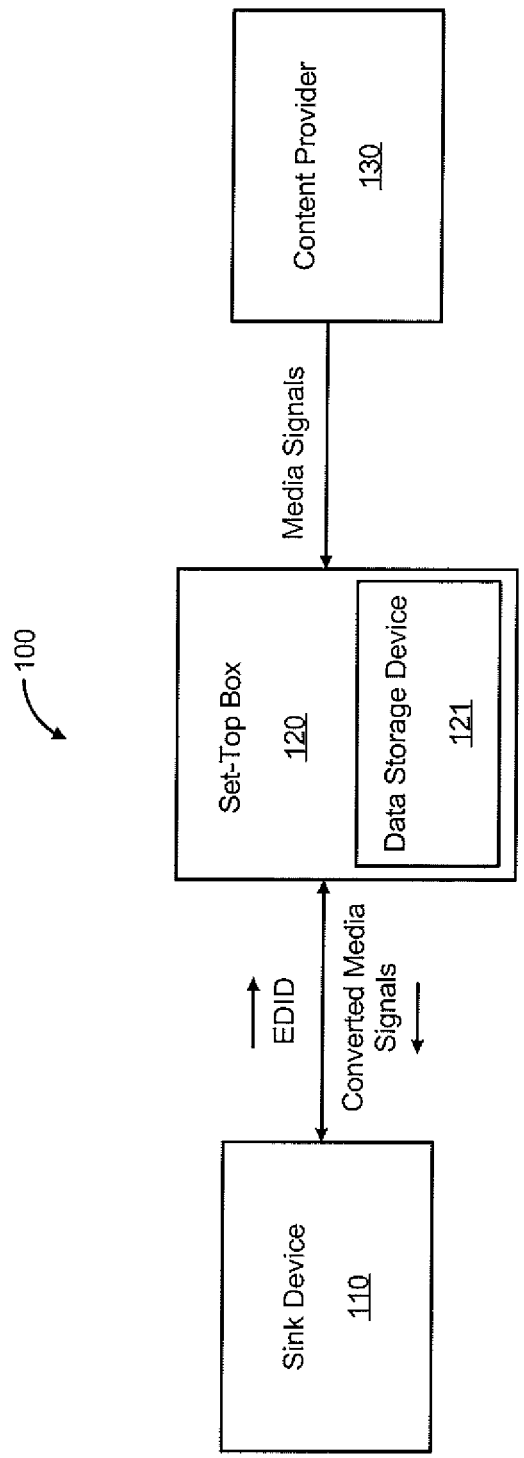
FIG. 1 illustrates a system including a set-top box for receiving from a content provider media signals and converting the received media signals to an output format supported by a sink device according to an embodiment of the invention.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

As referred to in this disclosure, EDID is data provided by a sink device to describe video and/or audio capabilities of the sink device in handling received media content and/or media signals and may be in various forms such as enhanced EDID (E-EDID) that includes information as to audio and video capabilities of the sink device. EDID may include any relevant information as to capabilities of the sink device such as a manufacturer name, product type, product identification, phosphor or filter type, timings supported by the sink device (for example, a display), color map, display size, luminance data, pixel mapping data, and a capacity to handle audio in mono, stereo, Dolby-Digital, etc. EDID is defined by a standard published by the Video Electronics Standards Association (VESA), but may also include EDIDs defined by other associations, standards, and extensions of existing standards. In providing relevant information as to capacities of the sink device, EDID may be provided in its entirety or in part to identify the individual sink device or at least its model to a source device such as a set-top box. In providing relevant information to a set-top box, the received EDID of the sink device may also include information as to output settings supported by the sink device and information as to which of the supported output settings is preferred by the sink device. EDID is employed in making and using products compliant with many different standards and specifications such as the Consumer Electronics Association (CEA), the High-Definition Multimedia Interface (HDMI) specifications, etc.

As referred to in this disclosure, media content is any reasonably suitable media content such as video, audio, pictures, music, etc, and media signals are any reasonably suitable signals carrying media content.

According to an embodiment, a set-top box receives media signals from a content provider, converts the received media signals to an output format supported by a sink device, and outputs the converted media signals to the sink device. The set-top box stores a directory of a list of EDIDs of previously-connected sink devices and compares the received EDID of the sink device to the stored EDIDs, where the directory also stores, for each stored EDID, corresponding output settings for the previously-connected sink devices for use in converting the received media signals.

In response to determining that one of the stored EDIDs matches the received EDID of the sink device, the set-top box selects, for use in converting the received media signals to an output format supported by the sink device, one of the stored output settings that correspond to the matching EDID in the directory. If none of the stored EDIDs matches the received EDID of the sink device, the set-top box obtains corresponding output settings indicated by the received EDID of the sink device, stores the obtained output settings and the EDID of the sink device as a part of the directory, and selects one of the obtained output settings as an output setting of the set-top box to be used in converting the received media signals. After selecting an appropriate output setting of the set-top box by either selecting one of the output settings corresponding to the matching EDID in the directory or selecting one of the obtained output settings for the received EDID of the sink device, if a user chooses to override the selected output setting, for example, by changing features of the selected output setting or by changing a preferred output setting from one to another of the supported output settings, such output setting change is stored in the directory of the list of stored EDIDs and corresponding output settings.

Turning now to FIG. 1, shown therein is a system 100 including a set-top box 120 for receiving from a content provider 130 media signals containing media content and converting the received media signals to an output format supported by a sink device 110, according to an embodiment of the invention. It should be understood that the system 100 may include additional components and that some of the components described herein may be removed and/or modified without departing from a scope of the system 100. While the system 100 is explained in this disclosure in connection with the set-top box 120 and EDID and, the same description and conversion features may be applied to other media presentation devices and other device-specific information of a sink device, respectively, where device-specific information may be any reasonably suitable information that identifies the sink device or associated output settings or capabilities of the sink device.

In discussing each component of the system 100 in more detail, the sink device 110 may be any reasonably suitable sink device for receiving from the set-top box 120 media signals containing media content such as a television (TV) set, a video or audio recorder, a computer display, etc. The sink device 110 has a data storage device for storing its EDID. When the sink device 110 is connected to the set-top box 120 and is turned on (for example, during a hot plug attach with the set-top box 120 or during a cold-boot of the set-top box 120), the sink device 110 transmits at least a portion of the EDID of the sink device 110 to the set-top box 120. The set-top box 120 in turn uses the received EDID of the sink device 110 in selecting output settings to convert media signals received from the content provider 130 to an output format (for example, HDMI format) supported by the sink device 110.

As discussed above, the received EDID of the sink device 110 may include a product identification of the sink device 110. The product identification such as a serial number or a model number may each indicate a product model, where sink devices 110 having the same product identification may be of a same model of sink devices 110 and may support same output formats of the set-top box 120. Alternatively, the product identification may be unique to each sink device 110. The product identification or any other reasonably suitable information in the received EDID of the sink device 110 may be compared with those of the stored EDIDs of previously-connected sink devices 110 in determining whether the set-top box 120 already has appropriate output settings stored in the set-top box 120 for use in converting the media signals received by the set-top box 120 to an output format supported by the sink device 110. The stored EDIDs of previously-connected sink devices 110 may each include the entirety or a portion of the respective EDID.

After the conversion by the set-top box 120 of the received media signals into an output format supported by the sink device 110, the sink device 110 receives from the set-top box 120 the converted signals. The sink device 110 may use the converted signals to play the media content contained in the converted signals or store the media content for later use. While only one sink device 110 is shown, there may be multiple sink devices 110 connected to the set-top box 120 at a time.

The set-top box 120 may be any reasonably suitable device that receives from the content provider 130 media signals containing media content and converts the received media signals to an output format supported by the sink device 110 such as an HDMI-equipped set-top box, DVI-equipped set-top box, etc. The set-top box 120 receives the EDID of the sink device 110 when the sink device 110 is connected to the set-top box 120 and is turned on (for example, during a hot plug attach with the set-top box 120 or during a cold-boot of the set-top box 120). The EDID of the sink device 110 may be received in whole or in part by the set-top box 120, where the received EDID information of the sink device 110 may include a portion used by the set-top box 120 to identify the individual sink device 110 or at least its model to a source device such as a set-top box. After receiving the EDID of the sink device 110, the set-top box 120 compares the received EDID of the sink device 110 to a plurality of stored EDIDs in a directory, where, for each stored EDID, the directory contains corresponding one or more output settings that indicate output formats supported by a sink device having the EDID. The stored EDIDs in the directory may each be the entirety or a portion of the respective EDID, and the directory may also include an indication as to which of the supported output settings by a sink device is preferred by the sink device 110. The plurality of stored EDIDs in the directory may be EDIDs of sink devices 110 that were previously connected to the set-top box 120, EDIDs of sink devices 110 that may potentially be connected to the set-top box 120, a combination of the foregoing EDIDs, etc.

In response to determining that one of the stored EDIDs in the directory matches the received EDID of the sink device 110, at least one of the corresponding one or more output settings of the stored EDID that matches the received EDID of the sink device 110 is selected for use in converting the media signals received from the content provider 130 to an output format supported by the sink device 110. The selected one of the corresponding one or more output settings may be an output setting indicated to be a preferred output setting. Alternatively, an output setting other than the preferred output setting may be selected, if, for example, the preferred output setting is not enabled by the set-top box 120. For each stored EDID, the corresponding one or more output settings may be a part of or separate from the stored EDID in the directory. While the conversion of the received media signals may include a conversion of the received media signals to a single output format supported by the sink device 110, the conversion of the received media signals may also include a conversion of the received media signals to a plurality of output formats supported by the sink device 110.

On the other hand, if none of the plurality of stored EDIDs matches the received EDID of the sink device 110, output settings corresponding to the received EDID of the sink device 110 may be obtained, and the obtained output settings and the received EDID of the sink device 110 may be stored in the directory. The output settings corresponding to the received EDID of the sink device 110 may be embedded within the received EDID and may thus be obtained directly from the received EDID of the sink device 110. Alternatively, the output settings corresponding to the received EDID of the sink device 110 may be obtained separately after the receipt of the EDID of the sink device 110 from a data storage device of the sink device 110. After obtaining the output settings corresponding to the received EDID of the sink device 110, at least one of the obtained output settings (for example, an output setting preferred by the sink device 110) may be selected by the set-top box 120 for use in converting the received media signals to an output format supported by the sink device 110.

In addition to and alternative to the above-described selection of the output setting to be used by the set-top box 120 in converting the received media signals to an output format supported by the sink device 110 (that is, by either selecting one of the output settings for the matching EDID or one of the obtained output settings for the received EDID of the sink device 110, whichever is appropriate), the selection of the output setting to be used by the set-top box 120 may be made by smart algorithms where patterns of use by a user (for example, a user's preference for a particular display format) over a period of time as detected by the set-top box 120 may be used in selecting an output setting to be used by the set-top box 120 for the sink device 1 10. For example, such a use pattern may be used in selecting an output setting to be used by the set-top box 120 for the sink device 110 in response to determining that none of the plurality of stored EDIDs matches the received EDID of the sink device 110.

After the selection of the output setting to be used by the set-top box 120 in converting the received media signals to an output format supported by the sink device 110 (that is, by either selecting one of the output setting for the matching EDID or one of the obtained output settings for the received EDID of the sink device 110, whichever is appropriate), if a user chooses to override the selected output setting, for example, by changing features of the selected output setting or by changing a preferred output setting to a different one of the supported output settings, then the output setting change is appropriately updated and stored in the directory of the set-top box 120. For example, the update and storage of the output setting change may occur by changing the preferred output setting to a different one or by recording changed features for the selected output setting. The user changes to output settings for the sink device 110 may be inputted and detected at the set-top box 120 or the sink device 110. In storing EDIDs and corresponding output settings as a part of the directory searchable by the set-top box 120, the directory may be stored in a data storage device 121 of the set-top box 120. Alternatively, the directory may be stored external to the set-top box 120 in an external storage device or a central server. For example, a device such as a remote control for the set-top box 120 may provide a directory of optimized output settings for TV sets from different manufacturers. If multiple set-top boxes 120 are used, the set-top boxes 120 may share each other's data storage device and may each retrieve appropriate EDIDs and corresponding output settings from the data storage devices of other set-top boxes 120.

When multiple sink devices 110 are connected to the set-top box 120 at one time or at different times, each sink device 110 may be connected to the set-top box 120 with appropriate output settings of the set-top box 120 selected for the sink device 110 according to the above-described operations. For example, if another sink device 110 is connected to the set-top box 120 and turned-on after connecting the first sink device 110 to the set-top box 120, the above-described operations of selecting appropriate output settings of the set-top box 120 may be repeated for the second sink device 110.

The content provider 130 may be any reasonably suitable content provider for providing media signals such as an internet service provider, a cable-TV operator, satellite-TV operator, on-line music store, etc.

Figure 2:
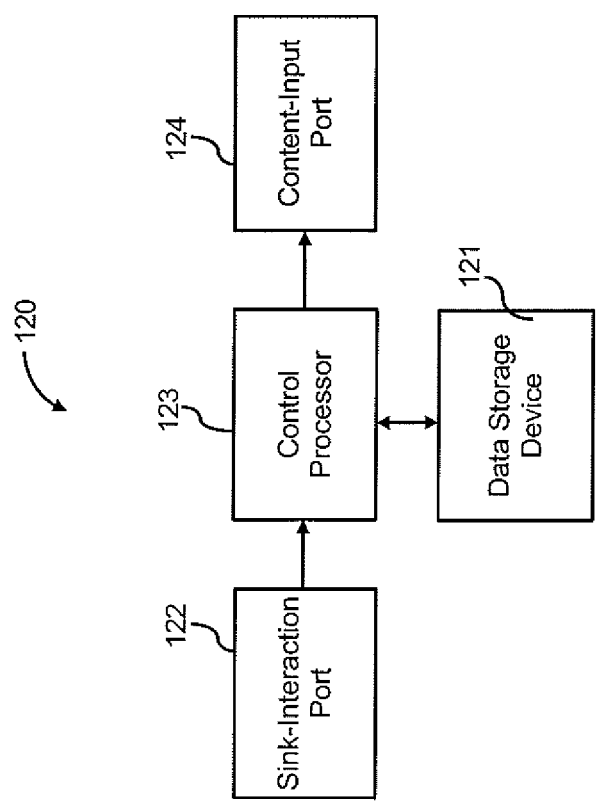
FIG. 2 illustrates a set-top box including a control processor for controlling the operations of the set-top box according to an embodiment of the invention.

Turning now to FIG. 2, shown therein is the set-top box 120 including a control processor 123 for controlling the operations of the set-top box 120 according to an embodiment of the invention. It should be understood that the set-top box 120 may include additional components and that some of the components described herein may be removed and/or modified without departing from a scope of the set-top box 120.

In describing the set-top box 120 more specifically, the set-top box 120 may include the data storage device 121, a sink-interaction port 122, the control processor 123, and a content-input port 124. The data storage device 121 stores instructions used by the control processor 123 in performing the operations of the set-top box 120. The data storage device 121 may also store a directory of a list of EDIDs and, for each stored EDID, corresponding one or more output settings useable by the control processor 123 in converting received media signals to an output format supported by the sink device 110, in response to the sink device 110 having the same EDID as the stored EDID. The data storage device 121 may be any reasonably suitable data storage device that facilitates a look-up of the directory such as a FIFO memory, a non-volatile memory, etc.

The sink-interaction port 122 may be any reasonably suitable port for receiving the EDID of a sink device and outputting converted media signals based on stored EDIDs. The sink-interaction port 122 may be formed of a single port for performing both the receipt of the EDID of the sink device 110 and output of the converted media signals. Alternatively, the sink-interaction port 122 may be formed of two separate ports for performing the receipt of the EDID of the sink device 110 and output of the converted media signals, respectively.

The control processor 123 may be any reasonably suitable processor for performing the operations of the set-top box 120. In receiving media signals, the content-input port 124 may be any reasonably suitable port for receiving media content from a content provider.

Figure 3:
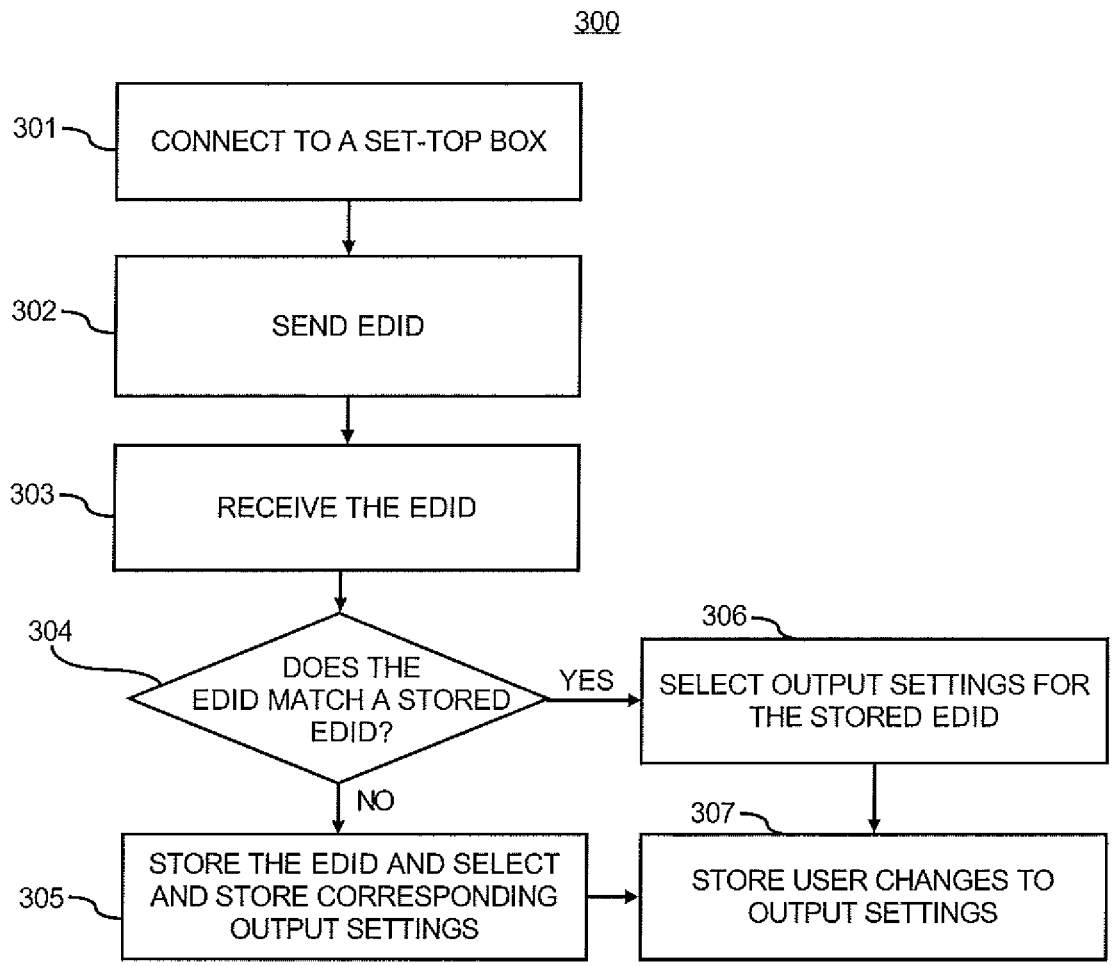
FIG. 3 illustrates a method for selecting output settings of a set-top box for a sink device based on the EDID of the sink device according to an embodiment of the invention.

Turning now to FIG. 3, shown therein is a method 300 for selecting output settings of the set-top box 120 for the sink device 110 based on the EDID of the sink device 110 according to an embodiment of the invention. It should be apparent to those of ordinary skill in the art that other steps may be added or existing steps may be removed, modified or rearranged without departing from a scope of the method 300.

At step 301, a sink device 110 is attached to a set-top box 120 and turned on.

At step 302, the sink device 110 sends the EDID of the sink device 110 to the set-top box 120.

At step 303, the set-top box 120 receives the EDID of the sink device 110.

At step 304, a determination is made as to whether the EDID of the sink device 110 matches any of the stored EDIDs of a plurality of previously-connected sink devices 110.

If none of the stored EDIDs matches the EDID of the sink device 110, output settings corresponding to the EDID of the sink device 110 is obtained and stored together with the EDID of the sink device 110 in the data storage device 121 at step 305. The obtained output settings for the EDID of the sink device 110 are selected by the set-top box 120 for use in converting received media signals to an output format supported by the sink device 110.

If one of the stored EDIDs matches the EDID of the sink device 110, corresponding output settings for the stored EDID are selected by the set-top box 120 for use in converting received media signals to an output format supported by the sink device 110 at step 306.

If a user changes the selected output settings of the set-top box 120 for the sink device 110, the output setting change is updated and stored in the directory of the data storage device 121 at step 307.

The above described method 300 may be repeated for a number of sink devices 110 that are connected to the set-top box 120.

The above-described operations of the system 100 and the set-top box 120 in reference to exemplary features and embodiments of FIGS. 1-3 may be contained as a computer program product embodied on one or more tangible computer readable storage mediums. The computer program product may exist in a variety of forms both active and inactive. For instance, the computer program product may exist as software program(s) comprised of program instructions in source code, object code, executable code or other formats whether compressed or uncompressed. Exemplary tangible computer readable storage mediums include conventional computer system RAM, ROM, EPROM, EEPROM, and magnetic or optical disks or tapes.

While exemplary features and embodiments of FIGS. 1-3 have been explained within the context of each feature and embodiment, any one or all of the exemplary features and embodiments of the invention may be applied and is incorporated in any and all of the embodiments of the invention unless clearly contradictory.

While the embodiments have been described with reference to examples, those skilled in the art will be able to make various modifications to the described embodiments without departing from the scope of the claimed embodiments.

What is claimed is:

1. A media presentation device for modifying sink device extended display identification data (EDID), the media presentation device comprising:
    a data storage device that stores EDIDs received from a plurality of sink devices, wherein each stored EDID stores with it one or more output settings for use in converting media signals to an output format supported by a respective sink device;
    a processor that, responsive to a sink device connection to the media presentation device and a user selection, changes one or more of the output settings associated with a corresponding stored EDID for at least one of the plurality of sink devices, wherein the data storage device stores a list of EDIDs for previously-connected sink devices with the one or more changed output settings for overriding the stored EDID output settings upon a subsequent hot plug connection of the at least one of the plurality of sink devices; and
    a sink-interaction port that receives extended display identification data (EDID) of a sink device connected via a hot plug connection to the media presentation device,
    wherein the processor, upon the hot plug connection of the sink device:
        determines whether the received EDID matches one of the EDIDs in the list of EDIDS for previously-connected sink devices, and
        in response to a determination that the received EDID matches one of the EDIDs in the list of previously-connected EDIDS, selects the one or more changed output settings for the matching EDID for use in converting the media signals for the sink device connected to the media presentation device, wherein the media signals carry media content.

2. The media presentation device of claim 1, wherein the received EDID of the sink device comprises data provided by the sink device to describe capabilities of the sink device in handling the media content.

3. The media presentation device of claim 1, wherein the processor is further configured to detect the user selection, wherein the user selection comprises a change by a user to features of a selected output setting associated with the corresponding sink device connection or a change to a preferred output setting associated with the corresponding sink device connection to a different one of the supported output settings.

4. The media presentation device of claim 3, wherein the processor is further configured to obtain one or more output settings from a sink device lacking a matching EDID in the data storage device and store the obtained one or more output settings for the sink device in the data storage device.

5. The media presentation device of claim 1, wherein the received EDID of the hot plug connected sink device and the stored EDIDs each comprise a product identification of a corresponding sink device, and determining whether the received EDID matches one of the EDIDs in the list of EDIDs for previously-connected sink devices includes a comparison of the product identification of the hot plug connected sink device with the stored product identifications.

6. The media presentation device of claim 5, wherein the product identification of the hot plug connected sink device is the same as a product identification of a different sink device, and determining whether the received EDID matches one of the EDIDs in the list of EDIDs for previously-connected sink devices includes a comparison of the product identification of the hot plug connected sink device with the product identification of the different sink device.

7. The media presentation device of claim 1, wherein the processor is further configured to detect a pattern of use by a user and select at least an output setting of the media presentation device based on the use pattern.

8. A method for converting media signals based on stored output settings, the method comprising:
    in a set-top box, performing:
        storing EDIDs received from a plurality of sink devices, wherein each stored EDID stores with it one or more output settings for use in converting media signals to an output format supported by a respective sink device;
        responsive to a sink device connection to the set-top box and a user selection, changing one or more of the output settings associated with a corresponding stored EDID for at least one of a plurality of sink devices;
        storing a list of EDIDs for previously-connected sink devices with the one or more changed output settings for overriding previously stored EDID output settings upon a subsequent hot plug connection of the at least one of the plurality of sink devices;
        receiving the media signals, wherein the media signals contain media content;
        receiving extended display identification data (EDID) of a sink device in response to a hot plug connection of the sink device to the set-top box; and
        upon the hot plug connection with the sink device, for a received EDID that matches an EDID in the list of EDIDs for previously-connected sink devices, selecting the one or more changed output settings for the respective EDID for use in converting the received media signals to an output format supported by the sink device connected to the set-top box.

9. The method of claim 8, wherein the received EDID of the hot plug connected sink device is data provided by the hot plug connected sink device to describe capabilities of the sink device in handling the media content.

10. The method of claim 8, further comprising detecting a change by a user to the one or more output settings associated with the corresponding stored EDID.

11. The method of claim 8, further comprising:
obtaining and storing output settings from a sink device lacking a matching EDID in stored EDIDs.

12. A computer program product embodied on one or more computer readable non-transitory storage mediums for converting media signals based on stored output settings, the computer program product comprising instructions for:
storing EDIDs received from a plurality of sink devices, wherein each stored EDID stores with it one or more output settings for use in converting media signals to an output format supported by a respective sink device;
responsive to a sink device connection to a set-top box and a user selection, changing one or more of the output settings associated with a corresponding stored EDID for at least one of a plurality of sink devices;
storing a list of EDIDs for previously-connected sink devices with the one or more changed output settings for overriding previously stored EDID output settings upon a subsequent hot plug connection of the at least one of the plurality of sink devices;
receiving the media signals, wherein the media signals contain media content;
receiving extended display identification data (EDID) of a sink device in response to a hot plug connection of the sink device to the set-top box; and
upon the hot plug connection with the sink device, for a received EDID that matches an EDID in the list of EDIDs for previously-connected sink devices, selecting the one or more changed output settings for the respective EDID for use in converting the received media signals to an output format supported by the sink device connected to the set-top box.

13. The computer program product of claim 12, wherein the received EDID of the sink device is data provided by the sink device to describe capabilities of the sink device in handling the media content.

14. The computer program product of claim 12, further comprising instructions for detecting a change by a user to the one or more output settings associated with the corresponding stored EDID.

* * * * *